United States Patent
Markowski et al.

(10) Patent No.: US 6,827,201 B1
(45) Date of Patent: Dec. 7, 2004

(54) VIBRATORY FEEDER FOR TRANSPORTING OBJECTS IN A CURVED PATH

(75) Inventors: Robert Markowski, McHenry, IL (US); Kurt Christopherson, South Elgin, IL (US); Eric Dickinson, Crystal Lake, IL (US); Richard B. Kraus, Barrington, IL (US)

(73) Assignee: General Kinematics Corporation, Barrington, IL (US)

( * ) Notice: Subject to any disclaimer, the term of this patent is extended or adjusted under 35 U.S.C. 154(b) by 0 days.

(21) Appl. No.: 10/460,702

(22) Filed: Jun. 12, 2003

(51) Int. Cl.[7] .................. B65G 27/32; B65G 27/02; B65G 27/08
(52) U.S. Cl. ................ 198/753; 198/756; 198/763
(58) Field of Search .............. 198/753, 756, 198/759, 752.1, 763, 770

(56) References Cited

U.S. PATENT DOCUMENTS

| | | | |
|---|---|---|---|
| 3,712,459 A | | 1/1973 | Musschoot et al. |
| 3,789,977 A | | 2/1974 | Musschoot |
| 4,181,216 A | * | 1/1980 | Cipu .................. 198/757 |
| 4,267,919 A | * | 5/1981 | Schrader .............. 198/756 |
| 4,611,709 A | | 9/1986 | Kraus et al. |
| 4,709,507 A | | 12/1987 | Musschoot |
| 4,844,236 A | | 7/1989 | Kraus |
| 4,926,601 A | | 5/1990 | Musschoot |
| 5,024,320 A | | 6/1991 | Musschoot |
| 5,054,606 A | | 10/1991 | Musschoot |
| 5,178,259 A | | 1/1993 | Musschoot |
| 5,713,457 A | | 2/1998 | Musschoot |
| 5,934,446 A | | 8/1999 | Thomson |
| 6,029,796 A | | 2/2000 | Musschoot |
| 6,112,883 A | | 9/2000 | Kraus et al. |
| 6,155,404 A | | 12/2000 | Musschoot |

* cited by examiner

Primary Examiner—Gene O. Crawford
(74) Attorney, Agent, or Firm—Marshall, Gerstein & Borun LLP

(57) ABSTRACT

A bidirectional vibratory feeder for transporting objects in a curved path has a trough assembly including an elongated, generally horizontal bed defining the curved path, and a center of gravity. Resilient isolators are connected to the trough assembly and adapted to isolate the trough assembly from underlying terrain. An exciter mass assembly includes an exciter frame and a vibration generator coupled to the exciter frame for generating vibratory forces, the exciter mass assembly having a center of gravity. At least one horizontally disposed resilient coupling is connected between the exciter mass assembly and the trough assembly, and at least one vertically disposed link is connected between the exciter mass assembly and the trough assembly. The vibratory forces generated by the vibration generator include a vertical component directed along a substantially vertical path that passes through a combined center of gravity of the trough assembly and the exciter mass assembly that is transferred by the at least one vertically disposed link to cause each point on the trough assembly to translate vertically upward. The vibratory forces also include a horizontal component that is transferred by the at least one horizontally disposed resilient coupling to cause each point on the trough assembly to rotate along a path lying on an arc of a circle in a horizontal plane. The vibration generator is operable in at least first and second modes, wherein, in the first mode, the horizontal component of the vibratory forces is directed along a first linear path displaced from the combined center of gravity to advance the objects in a first direction along the curved path and, in the second mode, the horizontal component of the vibratory forces is directed along a second linear path displaced from the combined center of gravity to advance the objects in a second, generally opposite direction along the curved path.

13 Claims, 4 Drawing Sheets

VIBRATORY FEEDER FOR TRANSPORTING OBJECTS IN A CURVED PATH

FIELD OF THE DISCLOSURE

The present disclosure generally relates to a vibratory apparatus and, in particular, to vibratory feeders or conveyors capable of transporting objects in a curved path.

BACKGROUND OF THE DISCLOSURE

Two-way vibratory feeders and conveyors are generally known in the art and have substantial applications in a variety of fields. In foundry operations, for example, castings may be delivered to the feeder or conveyor at a location intermediate its ends and the feeder or conveyor is energized to transport castings to one end or the other depending upon where it is desired to locate the casting.

Some conventional two-way conveyors include an elongated bed with an upwardly facing, generally horizontal, elongated feeding surface. The bed is conventionally supported on isolation springs adjacent to ends of the bed. Two vibration inducing assemblies, which typically will be electric motors with eccentric weights on their output shafts, are secured to the bed generally centrally thereof. Slats at approximately a 45° angle connect each of the motors to the bed, with the left most motor slats being canted approximately 45° to the left and the right most motor slats being canted approximately 45° toward the right, and angularly separated from the left most motor slats by approximately 90°. In operation, when the left most motor is energized, vibration resulting from eccentric revolution of the associated weight will cause material to be conveyed from right to left. When the other motor is energized, conveying will occur in the opposite direction. The slats typically used in such systems are substantially rigid, and therefore this type of apparatus is commonly referred to as a "brute force" or "single mass" system.

In many applications, it will not be unusual that there is a considerable disparity between the amounts of use of the left most motor and the right most motor. If one is energized to the substantial exclusion of the other, so called "false Brinnelling" of the motor bearings in the non-energized system will occur as a result of the vibration imparted to the bed. Lubricant may be squeezed out of the bearings as a result, and when the infrequently used system is finally energized, it may fail relatively quickly as a result of bearing failure due to "false Brinnelling" and the resulting insufficient lubrication.

To avoid these and other problems, in the commonly assigned application of Albert Musschoot entitled "Two-way Vibratory Feeder and Conveyor," now U.S. Pat. No. 5,713,457, there is proposed a bi-directional conveying system wherein a single reversible electric motor is utilized to impart vibration to a conveying surface. The direction of conveying can be altered simply by reversing the direction of rotation of the electric motor.

In this particular device, which works well for its intended purpose, the vibration inducing system including the electric motor with eccentric weights on its output shaft, produces vibrations in sizable amplitudes in all directions. Dampers are utilized to eliminate most of the vertical vibratory force component applied to the conveying surface by the single, reversible vibration inducing system, while allowing the full amplitude of the horizontal component of such force to be applied to the bed to achieve the desired conveying affect. In this system, it is necessary that a relatively large motor be employed to achieve the desired amplitude. As the desired amplitude, at least in the vertical direction, is absorbed as unnecessary to conveying and, in fact, must be absorbed in order to achieve conveying, it would seem as though a smaller motor could be used. However, when a smaller motor is employed, there is insufficient amplitude of vibratory forces in the horizontal direction to achieve the desired conveying rate. Thus, it is necessary to retain the relatively large motor, and that adds to the expense of the apparatus. This apparatus is also considered a "brute force" system.

The application of Albert Musschoot entitled "Two-way Vibratory Conveyor," now U.S. Pat. No. 6,029,796, also commonly assigned, proposes a bi-directional conveying system that may be driven by a smaller motor. A pair of horizontally acting vibration amplification systems is connected between a vibration inducing assembly and the bed, so that a comparable conveying rate is obtained with a substantially smaller motor. This apparatus, which resiliently couples the vibration inducing assembly to the bed, is commonly referred to as a "two mass" system.

In the device disclosed in the '796 patent, which works well for its intended purpose, the bed defines a linear flow path. Consequently, should a direction change be necessary, additional feeders or conveyors must be provided. Furthermore, the feeders must be modified, such as by making bias cuts in the bed, so that the objects are transported at the desired rate. This is particularly difficult in applications where a plurality of smaller objects are transported along the entire width of the bed, and where a substantially constant feed rate is desired across the width of the bed.

Other feeders and conveyors are known in which the objects are transported along a curved path on the bed. While these curved feeders have been provided as both single and two-mass systems, they have heretofore been capable only of transporting objects in a single direction along the curved flow path.

Figure 1:
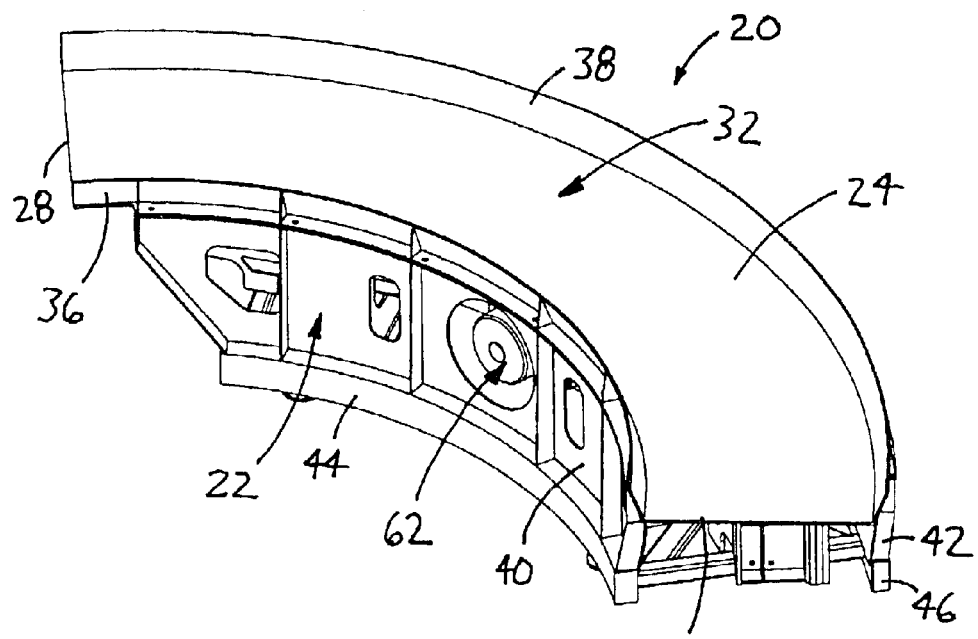
FIG. 1 is a perspective view of a curved two-way feeder constructed in accordance with the teachings of the disclosure.

While the following detailed description sets forth various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention as defined by the appended claims.

DETAILED DESCRIPTION

Referring now to the drawings, and with specific reference to FIG. 1, a bi-directional vibratory feeder constructed in accordance with the teachings of the disclosure is generally referred to by reference numeral 20. The feeder 20 may be employed in a variety of different settings including, but not limited to, foundries, agricultural and/or food processing plants, bulk handling and processing plants, and the like. In each of the envisioned settings, the feeder 20 can be employed to transport objects along a curved path in either direction, as desired. Furthermore, the rate at which objects are transported is substantially consistent across the entire width of the curved flow path. While the exemplary embodiment of the bi-directional vibratory feeder 20 is described herein as a feeder, that term is employed generically to include both feeders and conveyors.

Figure 7:
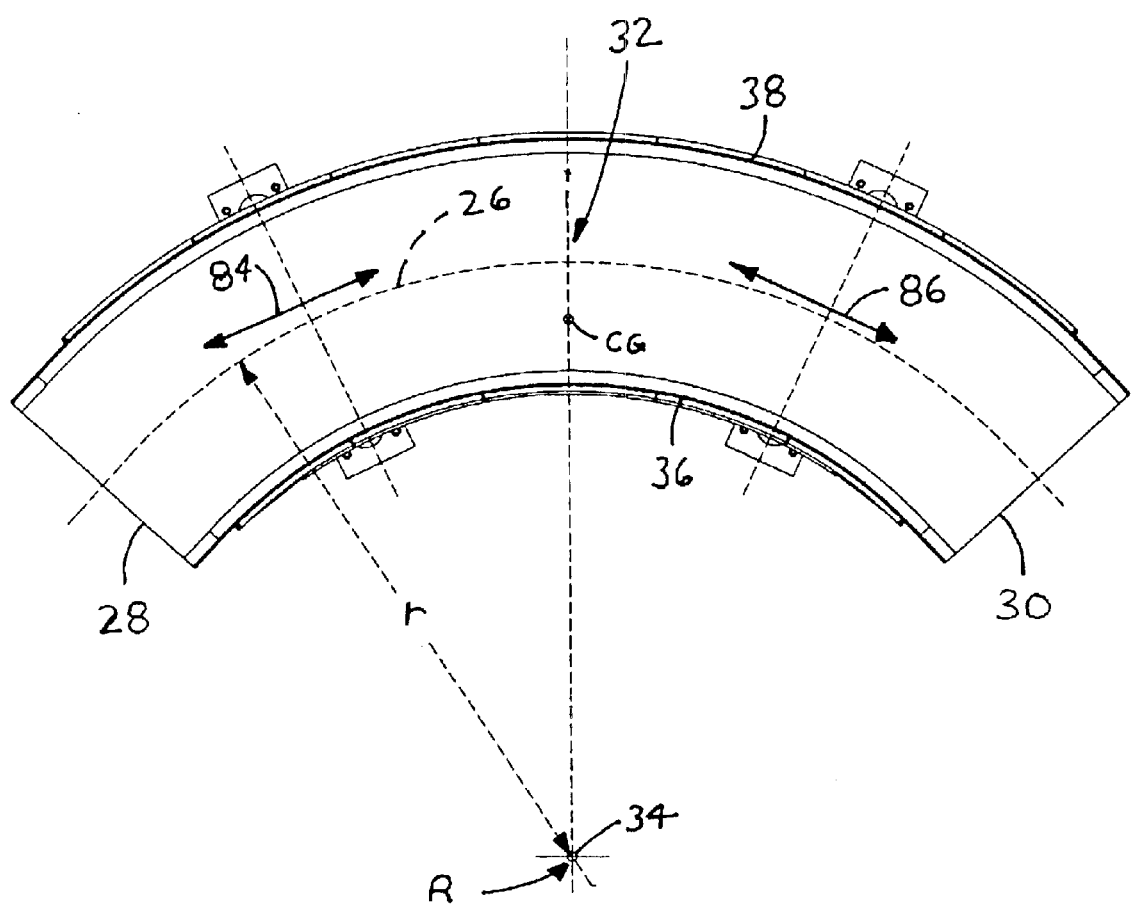
FIG. 7 is a plan view of the feeder of FIG. 1.

The bi-directional vibratory feeder 20 includes a trough assembly 22 having an elongated, generally horizontal bed 24 for supporting objects to be transported. The bed 24 defines a curved path 26 extending between first and second ends 28, 30 of the bed 24. A loading area generally designated 32 may be provided intermediate the first and second bed ends 28, 30 for receiving objects to be transported. In the illustrated embodiment, the loading area 32 is located generally equidistant from the first and second bed ends 28, 30, however the loading area 32 may be located in other positions. In addition, as best illustrated in FIG. 7, the curved path 26 may be shaped as an arc formed about a center point 34. In the illustrated embodiment, the curved path 26 traces a radius distance "r" from the center point 34 and spans a 90° arc about the center point 34.

Figure 3:
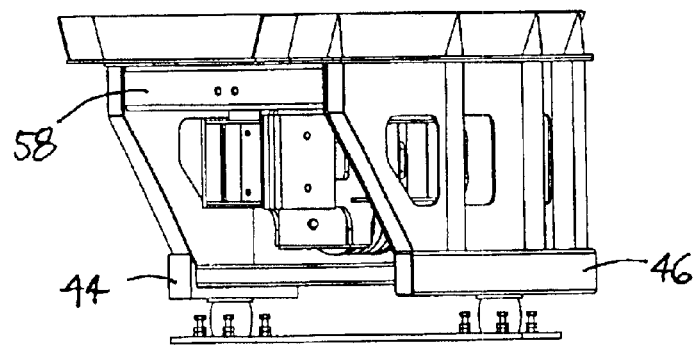
FIG. 3 is an end elevational view of the feeder of FIG. 1.
Figure 4:
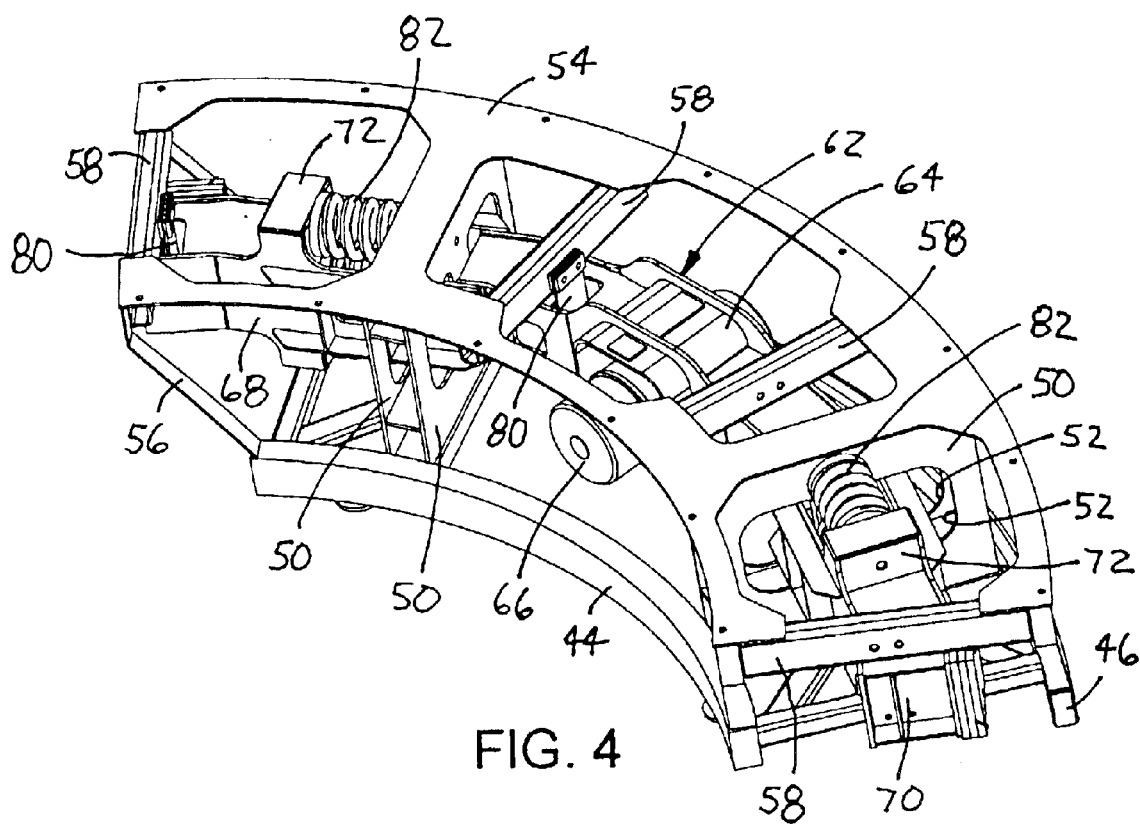
FIG. 4 is a perspective view of the feeder of FIG. 1 with certain components of the trough assembly removed.

Extending upwardly from the bed 24 are inner and outer rails 36, 38 for retaining objects on the bed 24 during operation. Depending from the bed 24 are inner and outer side plates 40, 42, and inner and outer base plates 44, 46 are attached respectively to the inner and outer side plates 40, 42. Base supports 48 and transversely oriented cross plates 50 extend between the inner and outer base plates 44, 46. Each cross plate 50 defines an aperture 52. A sub frame 54 for carrying the bed 24 is supported by the cross plates 50, side plates 40, 42 (illustrated in FIGS. 1–3), and end supports 56 extending from the inner and outer base plates 44, 46. Attached to an underside of the sub frame 54 are four cross channels 58, as best illustrated in FIG. 4.

According to the above description, the bed 24 is supported by a substantially rigid frame and support structure that is at least partially enclosed by the inner and outer side plates 40,42. In addition, these components lower the center of gravity of the trough assembly 22, the significance of which will be understood more fully below.

Figure 6:
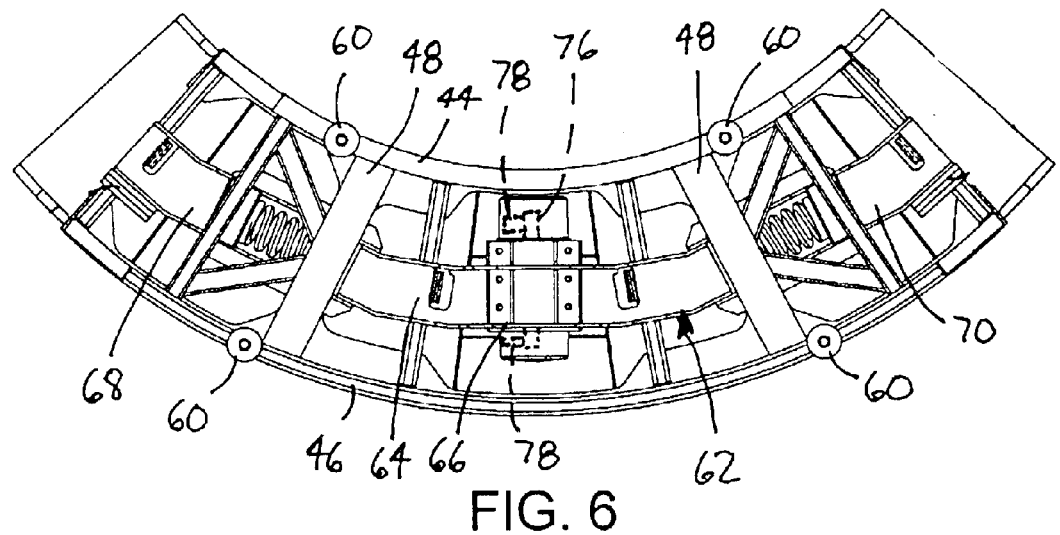
FIG. 6 is a bottom view of the feeder of FIG. 1.

Resilient isolators are connected to a bottom of the trough assembly 22 for supporting the trough assembly 22 above the underlying terrain. In the illustrated embodiment, the resilient isolators are provided as four springs 60, two each connected to inner and outer base plates 44, 46 (FIG. 6). As is generally understood in the art, the resilient isolators minimize the impact of the vibrations generated by the feeder on the surrounding environment.

Figure 5:
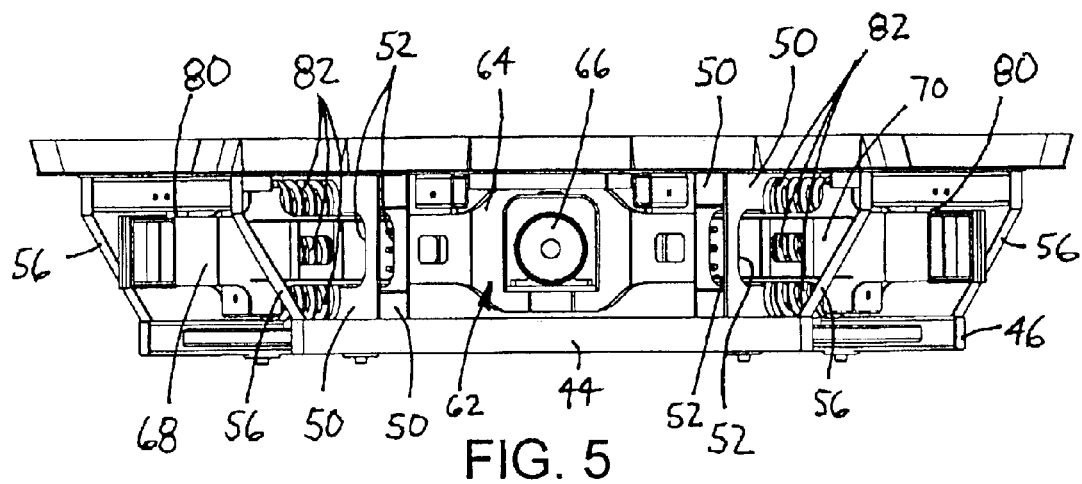
FIG. 5 is a side elevational view similar to FIG. 2 but with certain components of the trough assembly removed for clarity.

An exciter mass assembly, generally indicated with reference numeral 62, is provided for generating vibratory forces used by the feeder 20 to transport objects along the bed 24. As best shown in FIGS. 4–6, in which portions of the trough assembly 22 have been removed for clarity, the exciter mass assembly 62 generally comprises an exciter frame 64 carrying a vibration generator 66. The exciter frame 64 includes support arms 68, 70 that are sized to pass through the apertures 52 cut from the cross plates 50, and each frame arm 68, 70 includes a bracket 72 (FIG. 4).

The vibration generator 66 produces vibratory forces that are transmitted from the exciter frame 64 to the trough assembly 22, thereby producing a vibratory motion of the trough assembly 22. In the illustrated embodiment, the vibration generator 66 is provided as an electric motor having an output shaft 76 carrying eccentric weights 78. As best understood with reference to FIG. 6, eccentric weights 78 may be attached to the output shaft on opposite sides of the motor housing, and the output shaft 76 is rotated to produce vibratory forces, as is generally understood in the art. While the illustrated embodiment shows an electric motor, it will be appreciated that other types of vibration generators, such as a rotatable eccentric shaft, may be used without departing from the scope of this disclosure. The masses of the eccentric weights may be different to reposition the exciter mass assembly center of gravity and/or to adjust the relative direction in which the vibratory forces are applied, the significance of which will be understood more fully below.

Vertically oriented links are connected between the exciter mass assembly 62 and the trough assembly 22 for transmitting a vertical component of the vibratory forces produced by the vibration generator 66. In the illustrated embodiment, four vertically disposed slats 80 each have a first end attached to a cross channel 58 of the trough assembly 22 and a second end attached to the exciter frame 64. The slats 80 are substantially rigid in the vertical direction so that the horizontal component of the vibratory forces is directly applied to the trough assembly 22.

The exciter mass assembly 62 is further connected to the trough assembly 22 by horizontally oriented resilient couplings. In the illustrated embodiment, the resilient couplings comprise springs 82, each of which has a first end attached to a cross plate 50 of the trough assembly 22 and a second end attached to a bracket 72 of the exciter frame 64. The springs 82 have a resonant frequency in an axial direction so that, when the vibration generator 66 is operated at or near the resonant frequency, a horizontal component of the vibratory forces is amplified by the springs 82. The amplified horizontal component of force is applied by each spring 82 along a linear path, as generally indicated by double ended arrows 84, 86.

Figure 2:
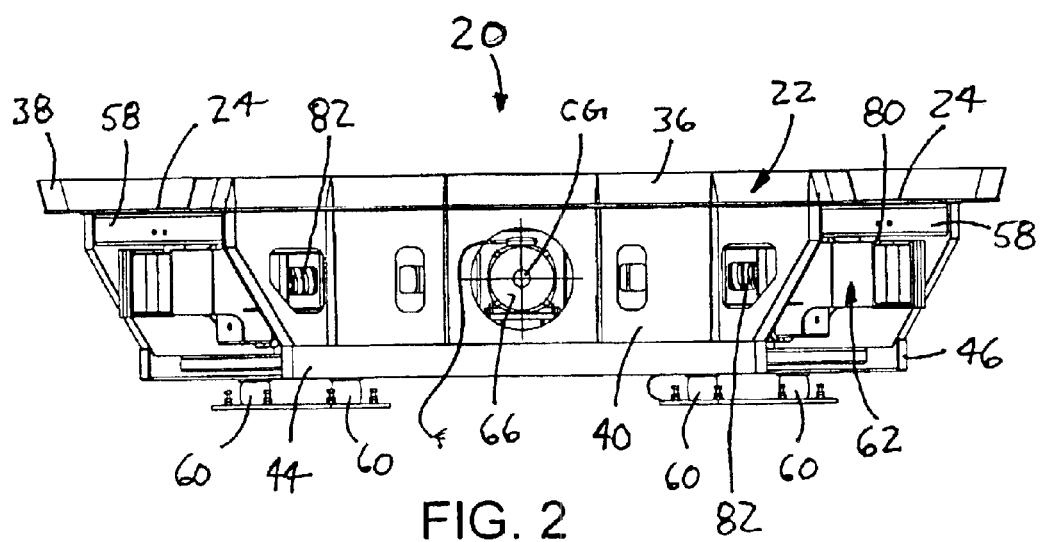
FIG. 2 is a side elevational view of the feeder of FIG. 1.

In order to reliably produce the desired vibratory motion of the trough assembly 22, the trough assembly 22 and exciter mass assembly 62 preferably have centers of gravity that are substantially coincident. The centers of gravity for both the trough assembly 22 and exciter mass assembly 62 are indicated in FIGS. 2 and 7 with the reference characters CG, and is alternately referred to herein as the combined center of gravity.

The feeder 20 is constructed so that the vertical component of the vibratory forces is directed along a substantially vertical path that passes through the combined center of gravity. In the illustrated embodiment, where the trough assembly center of gravity is substantially coincident with the exciter mass center of gravity, the slats are vertically aligned and substantially equidistantly spaced from the trough assembly center of gravity to direct the force through the combined center of gravity. The vertical component is transferred by the vertical slats 80 directly to the trough assembly 22 to cause vertical displacement of the bed 24, and therefore is applied in a "brute force" manner.

The horizontal component of the vibratory forces is applied in a linear direction that does not intersect, and therefore is offset from, the combined center of gravity so that the horizontal component drives the bed 24 in an arcuate path. As best shown in FIG. 7, the horizontal component of the vibratory force is applied in the linear directions indicated by double ended arrows 84, 86, which do not intersect the trough assembly center of gravity. The resulting horizontal motion of the trough assembly 22 is in an arcuate path having a center of rotation located at point "R". In the illustrated embodiment, the center of rotation R is substantially coincident with the center point 34 of the curved path 26, so that objects deposited on the bed 24 are transported along the curved path 26.

The center of rotation R is either a point or a small closed figure such as a small circle or ellipse, which for all practical purposes may be considered to be a point. The linear directions along which the horizontal component of the vibratory forces are applied to the trough assembly 22 lie on one side of the center of gravity CG and the point R will be on the other side of the center of gravity. By applying the horizontal component of the vibratory forces in this manner, each point on the bed 24 will rotate along a path lying on an arc of a circle in a horizontal plane. In the illustrated embodiment, where the center of rotation R is substantially coincident with the center point 34, the resulting motion of the bed 24 will transport each object or column of objects along a substantially constant radius path. For example, an object placed on the center line of the bed 24 will be transported substantially along that center line. Similarly, objects placed near the inner or outer rails 36, 38 will maintain substantially the same lateral distance from the inner or outer rail 36, 38 during transport. The rails 36, 38, however, do not direct the objects during normal operation.

The vibration generator is selectively operable in first and second modes to transport objects in either direction along the curved path 26. In the illustrated embodiment, where the vibration generator 66 is an electric motor, the motor is preferably reversible so that the output shaft 76 may be selectively rotated in both the clockwise and counter-clockwise directions. Accordingly, when the motor is rotated in the clockwise direction when viewed from the front (as illustrated in FIGS. 2 and 5), the resulting vibratory motion of the trough assembly 22 will advance objects deposited on the bed 24 toward the left or first end 28. Alternatively, when the motor is rotated in the counter-clockwise direction, the objects are advanced toward the right or second end 30 of the bed 24. Accordingly, with the loading area 32 located intermediate the first and second ends 28, 30, objects deposited on the bed 24 may be selectively advanced along the curved path 26 toward the first or second ends 28, 30. The horizontal springs 82 preferably have their axes oriented so that the center of rotation R is substantially constant in both the first and second modes, so that the objects are transported along substantially the same curved path 26 in both directions.

From the foregoing, it will be appreciated that the feeder 20 is capable of advancing objects in either direction along a curved path. In the illustrated embodiment, where the loading area 32 is equidistant from the bed ends 28, 30 and the curved path spans a 90° arc, the flow direction of the objects is altered by 45° in either direction. As a result, the direction along which the objects are transported is altered without requiring additional conveyors or feeders, or the alterations needed to properly transfer objects between such additional conveyors or feeders. Furthermore, it will be appreciated that the bi-directional curved feeder may be used to transport a single column of relatively large objects, such as castings, substantially along a center of the curved path. Alternatively, multiple columns of smaller objects may be transported wherein the feed rate of the objects is substantially constant across the entire width of the curved flow path (i.e., objects located along the outer rail 38 are advanced more quickly than objects located along the inner rail 36, so that an overall feed rate is substantially constant).

The foregoing detailed description has been given for clearness of understanding only, and no unnecessary limitations should be understood therefrom, as modifications would be obvious to those skilled in the art.

We claim:

1. A bidirectional vibratory feeder for transporting objects in a curved path, the feeder comprising:

a trough assembly including an elongated, generally horizontal bed defining the curved path, the trough assembly having a center of gravity;

resilient isolators connected to the trough assembly and adapted to isolate the trough assembly from underlying terrain;

an exciter mass assembly including an exciter frame and a vibration generator coupled to the exciter frame for generating vibratory forces, the exciter mass assembly having a center of gravity;

at least one horizontally disposed resilient coupling connected between the exciter mass assembly and the trough assembly; and at least one vertically disposed link connected between the exciter mass assembly and the trough assembly;

wherein the vibratory forces generated by the vibration generator include a vertical component directed along a substantially vertical path that passes through a combined center of gravity of the trough assembly and the exciter mass assembly that is transferred by the at least one vertically disposed link to cause each point on the trough assembly to translate vertically upward, and a horizontal component that is transferred by the at least one horizontally disposed resilient coupling to cause each point on the trough assembly to rotate along a path lying on an arc of a circle in a horizontal plane;

the vibration generator being operable in at least first and second modes, wherein, in the first mode, the horizontal component of the vibratory forces is directed along a first linear path displaced from the combined center of gravity to advance the objects in a first direction along the curved path and, in the second mode, the horizontal component of the vibratory forces is directed along a second linear path displaced from the combined center of gravity to advance the objects in a second, generally opposite direction along the curved path.

2. The feeder of claim 1, in which the exciter mass assembly center of gravity and the trough assembly center of gravity are substantially coincident.

3. The feeder of claim 1, in which the at least one link comprises a vertically disposed slat.

4. The feeder of claim 1, in which the curved path defines an arc having a center, and in which the curved path arc spans 90°.

5. The feeder of claim 1, in which the at least one resilient coupling comprises two horizontally oriented springs positioned on opposite sides of the vibration generator.

6. The feeder of claim 5, in which the horizontally oriented springs define axes along which the horizontal component of the vibratory forces is applied, wherein the axes do not intersect the combined center of gravity of the trough assembly and the exciter mass assembly.

7. The feeder of claim 1, in which each of the arcs of the paths along which each point on the trough assembly is rotated has a center of rotation.

8. The feeder of claim 7, in which a position of the center of rotation is substantially constant in the first and second modes.

9. The feeder of claim 7, in which the curved path defines an arc having a center, and in which the center of rotation is substantially coincident with the center of the curved path.

10. The feeder of claim 1, in which the vibration generator comprises a reversible motor having a rotatable output shaft carrying at least one eccentric.

11. The feeder of claim 10, in which the reversible motor is rotated in a first direction in the first mode, and in which the reversible motor is rotated in a second direction opposite the first direction in the second mode.

12. The feeder of claim 10, in which the at least one eccentric comprises a first eccentric mounted on a first end of the output shaft and a second eccentric mounted on a second, opposite end of the output shaft.

13. The feeder of claim 12, in which the first and second eccentric have different weights.

* * * * *